United States Patent
Leimkuehler et al.

(10) Patent No.: US 11,140,812 B2
(45) Date of Patent: Oct. 12, 2021

(54) SYSTEMS, METHODS, AND APPARATUS FOR CONTROLLING DOWNFORCE OF AN AGRICULTURAL IMPLEMENT

(71) Applicant: Kinze Manufacturing, Inc., Williamsburg, IA (US)

(72) Inventors: Scott W. Leimkuehler, Williamsburg, IA (US); David Schulte, Lincolnshire, IL (US); Shawn Mack, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 399 days.

(21) Appl. No.: 16/219,444

(22) Filed: Dec. 13, 2018

(65) Prior Publication Data
US 2019/0183036 A1    Jun. 20, 2019

Related U.S. Application Data

(60) Provisional application No. 62/599,272, filed on Dec. 15, 2017.

(51) Int. Cl.
| | | |
|---|---|---|
| A01C 7/20 | (2006.01) | |
| A01C 5/06 | (2006.01) | |
| A01B 63/111 | (2006.01) | |

(52) U.S. Cl.
CPC ............ *A01C 7/205* (2013.01); *A01B 63/111* (2013.01); *A01C 5/062* (2013.01); *A01C 5/066* (2013.01); *A01C 5/068* (2013.01); *A01C 7/203* (2013.01)

(58) Field of Classification Search
CPC ..... A01B 63/02; A01B 63/111; A01B 63/114; A01B 63/24; A01C 7/205; A01C 7/203; A01C 6/066; A01C 6/062; A01C 6/068
See application file for complete search history.

(56) References Cited

U.S. PATENT DOCUMENTS

| | | | |
|---|---|---|---|
| 4,176,721 A | 12/1979 | Poggemiller et al. | |
| 5,524,560 A | 6/1996 | Carter | |

(Continued)

FOREIGN PATENT DOCUMENTS

| | | |
|---|---|---|
| CA | 2549371 A1 | 11/2007 |
| CA | 2866045 A1 | 6/2015 |

(Continued)

OTHER PUBLICATIONS

Kinze Manufacturing, Inc., PCT/US2018/065512 filed Dec. 13, 2018, "The International Search Report and the Written Opinion of the International Searching Authority, or the Declaration", 13 pages, dated Apr. 3, 2019.

(Continued)

*Primary Examiner* — Jessica H Lutz

(74) *Attorney, Agent, or Firm* — McKee, Voorhees & Sease, PLC

(57) ABSTRACT

A downforce system adjusts the amount of downforce being applied to a row unit of an agricultural implement. The downforce system is controlled to increase or decrease the force on the row unit. A load is sensed at the row unit and compared to either or both of a user defined target and a lower threshold that can be based, at least in part, upon a percentage of a value. When the load is determined to be below the lower threshold, the user defined amount is increased at a rate of change until the load is above the threshold, at which point the increase is stopped, and reduced, if necessary.

18 Claims, 8 Drawing Sheets

(56) References Cited

U.S. PATENT DOCUMENTS

| | | |
|---|---|---|
| 6,389,999 B1 | 5/2002 | Duello |
| 6,827,029 B1 | 12/2004 | Wendte |
| 7,028,554 B2 | 4/2006 | Adamchuk et al. |
| 7,360,495 B1 | 4/2008 | Martin |
| 7,401,561 B1 | 7/2008 | Kurz |
| 8,275,525 B2 | 9/2012 | Kowalchuk et al. |
| 8,327,780 B2 | 12/2012 | Bassett |
| 8,359,988 B2 | 1/2013 | Bassett |
| 8,448,717 B2 | 5/2013 | Adams et al. |
| 8,469,114 B1 | 6/2013 | Borkgren |
| 8,522,889 B2 | 9/2013 | Adams et al. |
| 8,544,397 B2 | 10/2013 | Bassett |
| 8,544,398 B2 | 10/2013 | Bassett |
| 8,550,020 B2 | 10/2013 | Sauder et al. |
| 8,573,319 B1 | 11/2013 | Casper et al. |
| 8,634,992 B2 | 1/2014 | Sauder et al. |
| 8,636,077 B2 | 1/2014 | Bassett |
| 8,763,713 B2 | 7/2014 | Bassett |
| 8,776,702 B2 | 7/2014 | Bassett |
| RE45,091 E | 8/2014 | Bassett |
| 8,794,344 B2 | 8/2014 | Blunier et al. |
| 8,826,836 B2 | 9/2014 | Van Buskirk et al. |
| 8,827,001 B2 | 9/2014 | Wendte et al. |
| 8,843,269 B2 | 9/2014 | Anderson et al. |
| 8,863,857 B2 | 10/2014 | Bassett |
| 8,909,436 B2 | 12/2014 | Achen et al. |
| 8,910,581 B2 | 12/2014 | Bassett |
| 8,910,582 B2 | 12/2014 | Mariman et al. |
| 8,935,986 B2 | 1/2015 | Blomme et al. |
| 8,985,232 B2 | 3/2015 | Bassett |
| 9,055,712 B2 | 6/2015 | Bassett |
| 9,107,337 B2 | 8/2015 | Bassett |
| 9,107,338 B2 | 8/2015 | Bassett |
| 9,137,939 B2 | 9/2015 | Winick et al. |
| 9,148,989 B2 | 10/2015 | Van Buskirk et al. |
| 9,192,091 B2 | 11/2015 | Bassett |
| 9,215,838 B2 | 12/2015 | Bassett |
| 9,226,440 B2 | 1/2016 | Bassett |
| 9,232,687 B2 | 1/2016 | Bassett |
| 9,241,438 B2 | 1/2016 | Bassett |
| 9,271,437 B2 | 3/2016 | Martin et al. |
| 9,282,689 B2 | 3/2016 | Van Buskirk et al. |
| 9,288,937 B2* | 3/2016 | Sauder .................. A01B 13/08 |
| 9,307,690 B2 | 4/2016 | Bassett |
| 9,462,740 B2 | 10/2016 | Buelow |
| 9,462,744 B2 | 10/2016 | Isaacson |
| 9,485,900 B2 | 11/2016 | Connell et al. |
| 9,511,633 B2 | 12/2016 | Anderson et al. |
| 9,615,497 B2 | 4/2017 | Bassett et al. |
| 9,668,398 B2 | 6/2017 | Bassett |
| 9,675,004 B2 | 6/2017 | Landphair et al. |
| 9,693,496 B2 | 7/2017 | Tevs et al. |
| 9,723,778 B2 | 8/2017 | Bassett |
| 9,743,578 B2 | 8/2017 | Blomme et al. |
| 9,801,332 B2 | 10/2017 | Landphair et al. |
| 9,826,677 B2 | 11/2017 | Gervais et al. |
| 9,848,522 B2 | 12/2017 | Bassett |
| 9,943,027 B2 | 4/2018 | Sauder et al. |
| 10,010,025 B2 | 7/2018 | Dienst et al. |
| 2003/0019408 A1 | 1/2003 | Fraisse et al. |
| 2003/0101626 A1 | 6/2003 | Johnson |
| 2005/0120928 A1 | 6/2005 | Horn |
| 2005/0155536 A1 | 7/2005 | Wendte et al. |
| 2006/0065412 A1 | 3/2006 | Bauer |
| 2006/0131040 A1 | 6/2006 | Barber |
| 2006/0213407 A1 | 9/2006 | Sauder et al. |
| 2008/0011208 A1 | 1/2008 | Martin |
| 2009/0090521 A1 | 4/2009 | Moyna |
| 2009/0175235 A1 | 7/2009 | Spinar et al. |
| 2009/0266279 A1 | 10/2009 | Dillman |
| 2010/0180695 A1 | 7/2010 | Sauder et al. |
| 2010/0198529 A1 | 8/2010 | Sauder et al. |
| 2011/0005784 A1 | 1/2011 | Landoll et al. |
| 2011/0120357 A1 | 5/2011 | Schilling et al. |
| 2011/0228870 A1 | 9/2011 | Lastinger et al. |
| 2011/0313575 A1* | 12/2011 | Kowalchuk ............ A01C 7/205 700/282 |
| 2012/0017813 A1 | 1/2012 | Van Buskirk et al. |
| 2013/0032362 A1 | 2/2013 | Rylander |
| 2013/0046418 A1 | 2/2013 | Anderson |
| 2013/0247802 A1 | 9/2013 | Truax et al. |
| 2014/0000919 A1 | 1/2014 | Bachman et al. |
| 2014/0026748 A1 | 1/2014 | Stoller et al. |
| 2014/0277959 A1 | 9/2014 | Wagers et al. |
| 2015/0264857 A1 | 9/2015 | Achen et al. |
| 2015/0271986 A1* | 10/2015 | Sauder ................ A01B 63/008 172/2 |
| 2015/0289438 A1 | 10/2015 | Sauder et al. |
| 2016/0044857 A1 | 2/2016 | Sporrer et al. |
| 2016/0128265 A1 | 5/2016 | Bassett |
| 2017/0094889 A1 | 4/2017 | Garner et al. |
| 2018/0092288 A1* | 4/2018 | Garner .................. A01C 5/064 |
| 2018/0114305 A1* | 4/2018 | Strnad .................... G01N 33/24 |
| 2018/0168094 A1* | 6/2018 | Koch ..................... A01C 7/203 |
| 2019/0072114 A1* | 3/2019 | Myers ................... A01B 63/32 |
| 2019/0075710 A1* | 3/2019 | Strnad .................... A01C 7/042 |
| 2020/0221632 A1* | 7/2020 | Strnad .................... A01B 49/06 |

FOREIGN PATENT DOCUMENTS

| | | |
|---|---|---|
| CA | 2866049 A1 | 6/2015 |
| CN | 105103722 A | 12/2015 |
| CN | 103640815 B | 6/2016 |
| EP | 1052890 A1 | 11/2000 |
| EP | 1594355 B1 | 4/2008 |
| EP | 2353354 A1 | 8/2011 |
| EP | 2497348 A1 | 9/2012 |
| EP | 2554036 A1 | 2/2013 |
| EP | 1974596 B1 | 8/2013 |
| EP | 2497348 B1 | 3/2014 |
| EP | 2717667 B1 | 8/2017 |
| EP | 3259972 A1 | 12/2017 |
| RU | 2454058 C1 | 6/2012 |
| WO | 2009042238 A1 | 4/2009 |
| WO | 2009134144 A1 | 11/2009 |
| WO | 2009149473 A2 | 12/2009 |
| WO | 2010056834 A1 | 5/2010 |
| WO | 2011161140 A1 | 12/2011 |
| WO | 2012149367 A1 | 11/2012 |
| WO | 2012149415 A1 | 11/2012 |
| WO | 2013025898 A1 | 2/2013 |
| WO | 2013049198 A1 | 4/2013 |
| WO | 2014004633 A1 | 1/2014 |
| WO | 2014026183 A2 | 2/2014 |
| WO | 2014066650 A1 | 5/2014 |
| WO | 2015031840 A1 | 3/2015 |
| WO | 2017197274 A1 | 11/2017 |
| WO | 2018075788 A1 | 4/2018 |

OTHER PUBLICATIONS

Kinze Manufacturing, Inc., PCT/US2018/044098 filed Jul. 27, 2018, "The International Search Report and the Written Opinion of the International Searching Authority, or the Declaration", 19 pages, dated Oct. 30, 2018.

* cited by examiner

SYSTEMS, METHODS, AND APPARATUS FOR CONTROLLING DOWNFORCE OF AN AGRICULTURAL IMPLEMENT

CROSS REFERENCE TO RELATED APPLICATIONS

This application claims priority under 35 U.S.C. § 119 to provisional application U.S. Ser. No. 62/599,272, filed Dec. 15, 2017. The provisional patent application is herein incorporated by reference in its entirety, including without limitation, the specification, claims, and abstract, as well as any figures, tables, appendices, or drawings thereof.

FIELD OF THE INVENTION

The disclosure is related generally to the field of agricultural implements. More particularly, but not exclusively, the disclosure includes aspects related to operations and controls of one or more agricultural downforce systems of an agricultural implement.

BACKGROUND OF THE INVENTION

An agricultural row crop planter is a machine built for precisely distributing seed into the ground. The row crop planter generally includes a horizontal toolbar fixed to a hitch assembly for towing behind a tractor or other implement. Row units including seed meters are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

In its most basic form, the seed meter includes a housing, a seed disc, and a seed chute. The housing is constructed such that it creates a reservoir to hold a seed pool. The seed disc resides within the housing and rotates about a generally horizontal central axis. As the seed disc rotates, it passes through the seed pool where it picks up individual seeds. The seeds are subsequently dispensed into the seed chute where they drop into the seed furrow.

As the agricultural planter row unit travels across fields with variable soil types, soil moisture, residue levels and topography, as well as the change in weight of components on or at row units, it can be difficult to maintain constant seed depth and other parameters due to changing conditions which would ideally require varying the row unit down force pressure. For example, farming with higher residue levels also requires higher row unit down force levels as row cleaners, coulters and other attachments require applied force to keep them in the ground and at consistent depths.

It is generally known that the total downforce acting on a row unit comprises the weight of the row unit plus the weight of any commodities thereon or thereat, plus any addition downforce provided by a system, such as through an actuator. The additional or supplemental force required or desired may therefore be affected by such factors as the type of soil, makeup of soil, compaction, weight of row unit, weight of commodities, etc. Furthermore, this may vary throughout a field and at each of the row units making up the agricultural implement. Still further, an up force may be desired if the weight of the row unit and commodities creates a depth greater than desired or if compaction would result from the weight of a system.

While attempts have been made to control the amount of additional downforce provided to a row unit, there is still a need in the art for systems, methods, and apparatus that provide for desired downforce to attempt to set and maintain a depth of a furrow in a field.

SUMMARY OF THE INVENTION

Therefore, it is a principal object, feature, and/or advantage of the disclosed features to overcome the deficiencies in the art.

It is another object, feature, and/or advantage of the disclosed features to provide a control system for operating an up and downforce system of a row unit.

It is yet another object, feature, and/or advantage of the aspects of the disclosure to provide a system, method, and/or apparatus to individually control the up and downforce at each of the row units of an agricultural planter.

It is yet another object, feature, and/or advantage to provide a system than can be manually or automatically adjusted to adjust the amount of up and/or down force applied to a row unit.

It is a further object, feature, and/or advantage of the aspects of the present disclosure to provide a system for maintaining an up or downforce of a row unit of an agricultural planter that maintains the depth of a furrow created by components of the row unit.

These and/or other objects, features, and advantages of the disclosure will be apparent to those skilled in the art. The present invention is not to be limited to or by these objects, features, and advantages. No single embodiment need provide each and every object, feature, or advantage.

According to some aspects of the invention, a method of controlling a downforce assembly for use with a row unit of an agricultural implement is provided, and includes setting a user defined target of an amount of downforce load for a row unit, sensing a load of the row unit, comparing the sensed load with a lower threshold, and when the sensed load is below the lower threshold, adding force (e.g., by way of a mean shift) to the user defined target by a rate of change to move the load to above the lower threshold.

At least some embodiments include that the sensed load is a sensed gauge wheel load.

Additional embodiments further include decreasing the force toward the user defined target when the sensed load is above the lower threshold.

At least some embodiments include that the force is decreased automatically by a rate of change upon a detection that the sensed load is above the lower threshold.

At least some embodiments include that the force is decreased manually by a user.

Additional embodiments further include identifying an upper threshold limit, and comparing the sensed load with both the upper and the lower threshold.

Additional embodiments further include when the sensed load is above the upper threshold, reducing force to the user defined target at a rate of change to move the load to below the upper threshold or towards zero.

At least some embodiments include that the reduction of force is done automatically.

At least some embodiments include that the reduction of force is done manually.

At least some embodiments include that the decrease of force comprises a. a first change of rate for decreasing the force when the sensed load is below the upper threshold; and b. a second change of rate for decreasing the force when the sensed load is above the upper threshold.

According to additional aspects of the invention, a system for controlling an amount of downforce applied to a row unit of an agricultural implement includes a downforce actuator coupled to a row unit to apply an amount of down force to the row unit, a sensor associated with the row unit to sense an amount of force being applied to the row unit and at least partially based upon the ground acting on the row unit, and a controller in communication with the downforce actuator and the sensor. The controller receives said sensed amount of load being applied to the row unit, and wherein said controller configured to comparing the sensed load with a user defined target and a lower threshold limit, and when the sensed load is below the lower threshold limit, adding a mean shift to the user defined target by a rate of change to move the sensed load to above the lower threshold.

Additional embodiments further include a gauge wheel coupled to the row unit, and wherein the sensed force is the force sensed by the gauge wheel.

At least some embodiments include that the controller further configured to decrease the force toward the user defined target when the sensed load is above the lower threshold.

At least some embodiments include that the controller automatically decreases the force toward the user defined target upon a determination that the sensed load is above the lower threshold.

At least some embodiments include that the lower threshold is calculated to be approximately about 25% of a maximum target load for a row unit or about 67% of the lowest user defined target.

At least some embodiments include that the lower threshold is fixed and is independent of the user defined target.

Still additional aspects of the invention include a method of controlling the amount of downforce applied to a row unit of an agricultural implement by sensing a load of the row unit, communicating the sensed load to a controller, wherein the controller: compares the sensed load with a user defined target and a lower threshold limit; and when the sensed load is below the lower threshold limit, adding force to the user defined target by a rate of change to move the sensed load to above the lower threshold.

Additional embodiments further include decreasing the force toward the user defined target at a first rate of change when the sensed load is above the lower threshold.

Additional embodiments further include capping the added force at a mean shift limit, wherein the mean shift limit is approximately equal to 40% of a maximum target or the difference between the default user defined targets.

Additional embodiments further include decreasing the force to the user defined target at a second rate of change when the sensed load is above an upper threshold.

Figure 1:
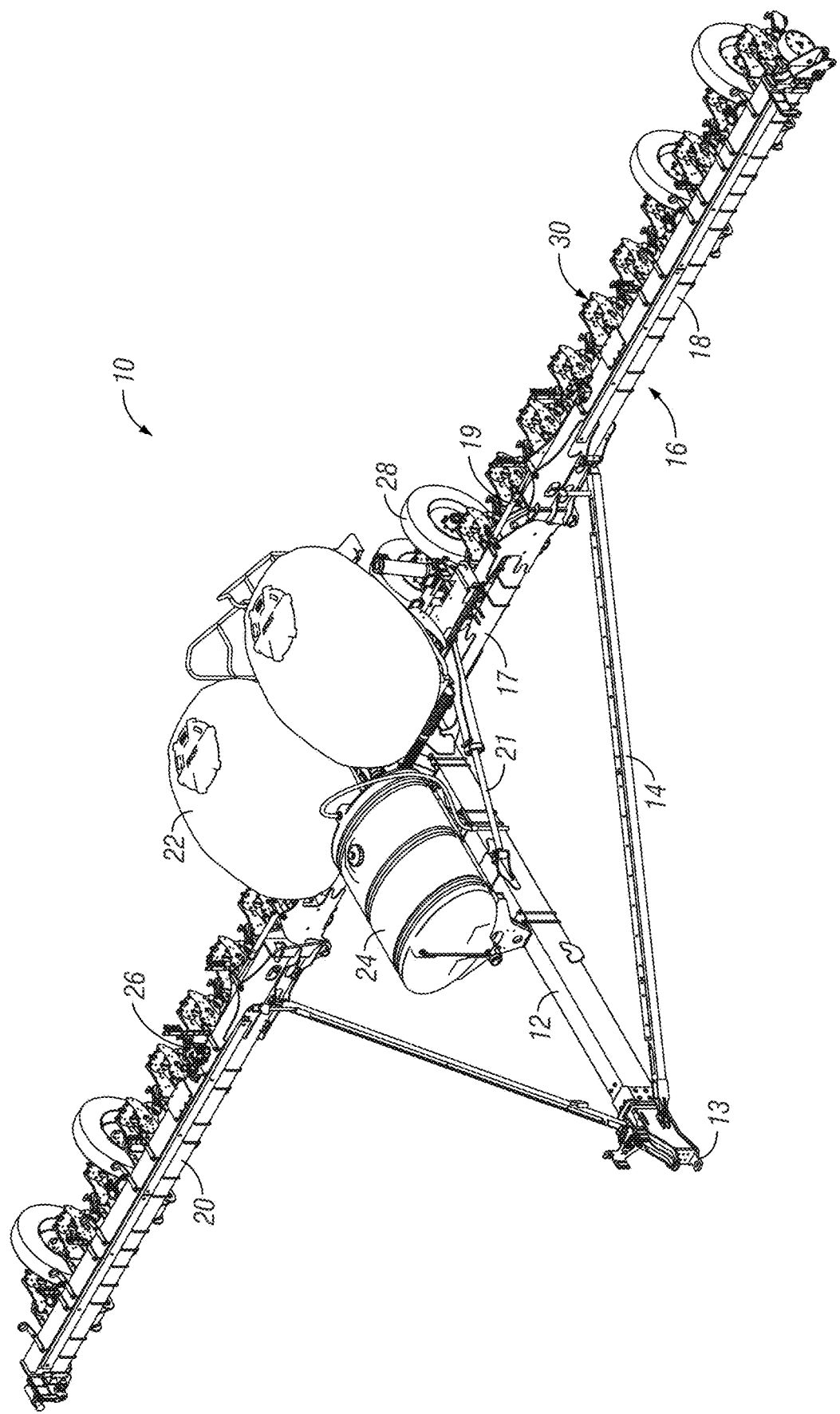
FIG. 1 is a perspective view of an agricultural planting implement.

Various embodiments of the present disclosure illustrate several ways in which the present invention may be practiced. These embodiments will be described in detail with reference to the drawings, wherein like reference numerals represent like parts throughout the several views. Reference to specific embodiments does not limit the scope of the present disclosure and the drawings represented herein are presented for exemplary purposes.

DETAILED DESCRIPTION OF THE INVENTION

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include plural referents unless context clearly indicates otherwise. Similarly, the word "or" is intended to include "and" unless context clearly indicate otherwise. The word "or" means any one member of a particular list and also includes any combination of members of that list.

The terms "invention" or "present invention" as used herein are not intended to refer to any single embodiment of the particular invention but encompass all possible embodiments as described in the specification and the claims.

The term "about" as used herein refers to variation in the numerical quantities that can occur, for example, through typical measuring techniques and equipment, with respect to any quantifiable variable, including, but not limited to, mass, volume, time, distance, wave length, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Terms such as first, second, vertical, horizontal, top, bottom, upper, lower, front, rear, end, sides, concave, convex, and the like, are referenced according to the views presented. These terms are used only for purposes of description and are not limiting unless these terms are expressly included in the claims. Orientation of an object or a combination of objects may change without departing from the scope of the invention.

The apparatuses, systems, and methods of the present invention may comprise, consist essentially of, or consist of the components of the present invention described herein.

The term "consisting essentially of" means that the apparatuses, systems, and methods may include additional components or steps, but only if the additional components or steps do not materially alter the basic and novel characteristics of the claimed apparatuses, systems, and methods.

The following embodiments are described in sufficient detail to enable those skilled in the art to practice the invention however other embodiments may be utilized. Mechanical, procedural, and other changes may be made without departing from the spirit and scope of the invention. Accordingly, the scope of the invention is defined only by the appended claims, along with the full scope of equivalents to which such claims are entitled. The contents of co-owned U.S. Application No. 62/542,344, filed on Aug. 8, 2017, and U.S. Application No. 62/538,309, filed on Jul. 28, 2017, are hereby incorporated by reference in their entirety and for all purposes.

FIG. 1 is a perspective view of an agricultural implement. The agricultural implement 10 as shown in FIG. 1 is also known as a planter or planting unit. The agricultural planter 10 as shown in the figure is used to plant one or more types of crop in a field. For example, the planter 10 may be a precision planting implement that is used to place seed with precision in a field to be most efficient and to optimize growing conditions for the planted seed types in the field. However, the implement may be generally any implement used in precision farming. The planter 10 as shown in FIG. 1 includes a tongue 12 including a hitch 13 at a first end thereof. The hitch is used generally to attach to a tractor or other tow vehicle (not shown). The tongue generally extends in the direction of travel of the tow vehicle. At an opposite end of the tongue 12 is a toolbar 16. The toolbar shown in FIG. 1 extends generally perpendicular to the tongue 12 when in a planting configuration. Connecting the toolbar 16 and the tongue 12 are draft links 14. The draft links 14 can be used to maintain the perpendicular configuration of the toolbar 16 relative to the tongue 12 while in a planting position. Furthermore, the tongue may be a telescoping type tongue such that the planter 10 is a front folding planter unit. As shown in FIG. 1, one or more folding cylinders 21 may be connected between the toolbar 16 and the tongue 12 and can be extended or retracted to move the implement 10 between the field configuration as shown in FIG. 1 and a transport configuration, wherein generally the toolbar 16, or parts thereof, are substantially parallel to the tongue 12. The exact configuration of the planting unit 10 is not to be limiting on the invention of the disclosure herein.

The toolbar 16, depending on the width of the implement, may include sections. As shown in FIG. 1, the toolbar 16 may include a center toolbar section 17, along with first and second wings sections or wing toolbar sections 18, 20 extending from opposite sides of the central toolbar section 17. The sections or wings 18, 20 of the toolbar 16 allow for the planter to be folded in a frontward or upright manner for transport. However, the exact nature of the toolbar is also not to be limiting to the invention of the present disclosure. For example, it is also contemplated that the toolbar could be a lift and rotate style planter, or the like. Also shown in the Figure are one or more wing down pressure cylinders 19. The wing down pressure cylinders 19 are positioned generally at the location where the wings extend from the central toolbar. The wing down pressure cylinder 19 can be used to maintain a down pressure at the wings and also to lift the wings when needed.

Additionally, as part of the planter 10, one or more bulk seed tanks 22, as well as a fertilizer tank 24 can be included. The contents of both the seed and/or fertilizer tanks 22, 24 can be delivered to individual row units via an air seed delivery system or other delivery system. This will allow the weight to be maintained generally at the locations of the tanks. However, it should also be appreciated that the row units include row unit hoppers instead of utilizing bulk fill, wherein the row unit hoppers include seed and/or fertilizer. However, the weights of the hoppers at the row units also affect down force and/or down pressure. Also shown in the Figure are a plurality of wheels 28 and a plurality of fans 26. The fans 26 can be utilized to aid in the air delivery system for the hoppers, and can also provide for pressure differentials for seed meters of row units 30. The wheels 28 can be used to transport the planter and to allow for easier movement through a field. A plurality of ground engaging members in the form of row units 30 are connected to the toolbar 16 and are utilized for performing an agricultural operation (e.g., planting, seeding, drilling, tilling, etc.).

Figure 2:
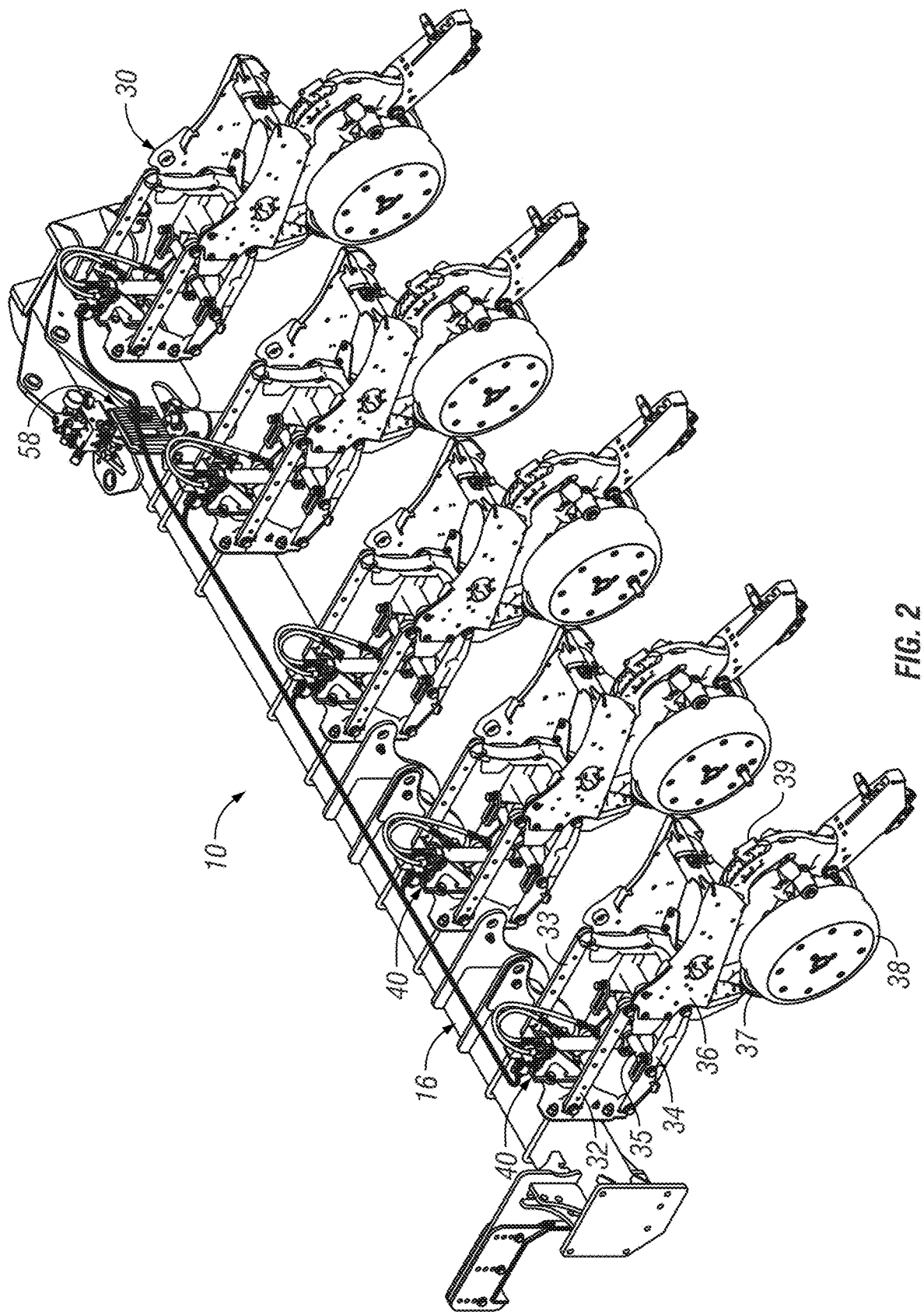
FIG. 2 is a perspective view of a selected number of row units attached to a toolbar of an agricultural planting implement.

FIG. 2 is an enlarged view of a portion of the planter 10. The figure shows a section of the toolbar 16 including a number of row units 30 attached thereto. As shown in FIG. 1, a number of row units 30 will be positioned along the length of the toolbar, including the sections thereof. The row units can take many forms, and can be ground engaging. Examples of row units for use with the implement can be tilling units, planting units, seeders, drills, or the like. The row units 30 could include multiple members for performing multiple agricultural operations, as well. The invention of the present disclosure is not to be limited to the exact configurations or to that listed herein, and is to be contemplated to include generally any type of ground engaging unit as may be known and/or used for agricultural operations. The row units 30 are connected to the tool bar 16 such that the row units are generally supported by the toolbar 16 (however, they will also be self-supporting in some manner when in contact with the ground or otherwise ground-engaging). A linkage 32 can be used to connect between a mount 31, which is connected to the toolbar 16, and a frame portion 36 of the row unit 30. The linkage 32 as shown in the figures includes upper bars 33 and lower bars 34. The four-bar linkage 32 allows for some vertical movement of the row unit 30 relative to the toolbar 16, and vice versa, as the planter 10 moves through a field. In addition, it should be appreciated that additional types and/or configurations of linkages and/or other connection components to allow for such vertical movement of the row unit 30 relative to toolbar 16 can be included as part of the components disclosed herein, and are to be considered a part of the invention disclosed herein. Furthermore, in some instances, the linkage may be set or configurable to prevent movement of the row unit 30 in relation to the toolbar 16, in a temporary or permanent basis.

The row unit 30 therefore includes a frame 36. An opener wheel or wheels 37 is connected to the frame. The opener disks or other opening members (disks, coulter, shank, etc.) are penetrated into the ground to create a furrow for depositing a seed therein. For example, figures do not disclose a seed meter or meters at the row unit 30. However, as shown in co-owned U.S. Pat. Nos. 9,282,691 and 9,622,402, herein incorporated by reference in their entirety, seed meters can be utilized with a furrow opener 37 to deposit seeds in a controlled manner to allow for spacing therebetween to provide for optimal growing conditions. The opener sets the depth of placing the seeds, and can be controlled, as will be understood. One or more depth setting members, such as gauge wheels 38, can be included as part of the row unit 30 to aid and control the depth of the furrow created by the opening member 37. An adjustment member 39 is also included in the row units 30 as is shown in the figures, and can be utilized to adjust the depth of the opening member 37 relative to a closing system and/or gauge member 38. Therefore, the depth of the furrow can be adjusted either manually (e.g., mechanically) or electronically, such as manually or automatically, to provide for a consistent or chosen depth for planting the seed in a field. Such manners of controlling can be found in co-owned U.S. patent application Ser. No. 13/457,577, filed Apr. 27, 2012; U.S. patent application Ser. No. 13/457,815, filed on Apr. 27, 2012; and U.S. patent application Ser. No. 13/458,012, filed Apr. 27, 2012, with the contents of all being incorporated by reference in their entirety and for all purposes.

However, as field conditions may change dependent on a number of conditions, the depth may not always be set in the furrow. For example, field conditions such as soil types, soil makeup, obstructions, and the like may affect the ability to maintain a desired furrow depth by a row unit. Therefore, aspects of the present disclosure include the addition of a down force assembly 40 operatively connected to the row units 30 and the toolbar 16. Each row unit can be operatively connected to a down force assembly 40 via the linkage 32. While the term "down force assembly" is commonly used herein, it is to be appreciated that the down force assembly 40 can be utilized to provide both down and up forces to the row units 30 and generally relative to the tool bar 16. As will be understood, a down force is a net force acting generally downward or towards the field, as evidenced by the row unit, while an up force is the opposite in that it is a net force in an upward manner away from the field. The force applied to the row unit 30 can aid in maintaining the desired depth in the furrows created by the components of the row units 30. Thus, in more compact soil conditions, for example, the amount of down force may need to be increased in order to press the opening member 37 with more force into the ground such that the desired depth of furrow created by the opening member is maintained at or near the desired depth. However, the ability to provide up force by the down force assembly 40 also will allow for the row unit to be generally lifted or else relieved of its weight. This can be used when there is to be less weight than the row units themselves being needed by the field or other ground conditions, or even when the row units are to be lifted from the ground.

Figures 3A, 3B:
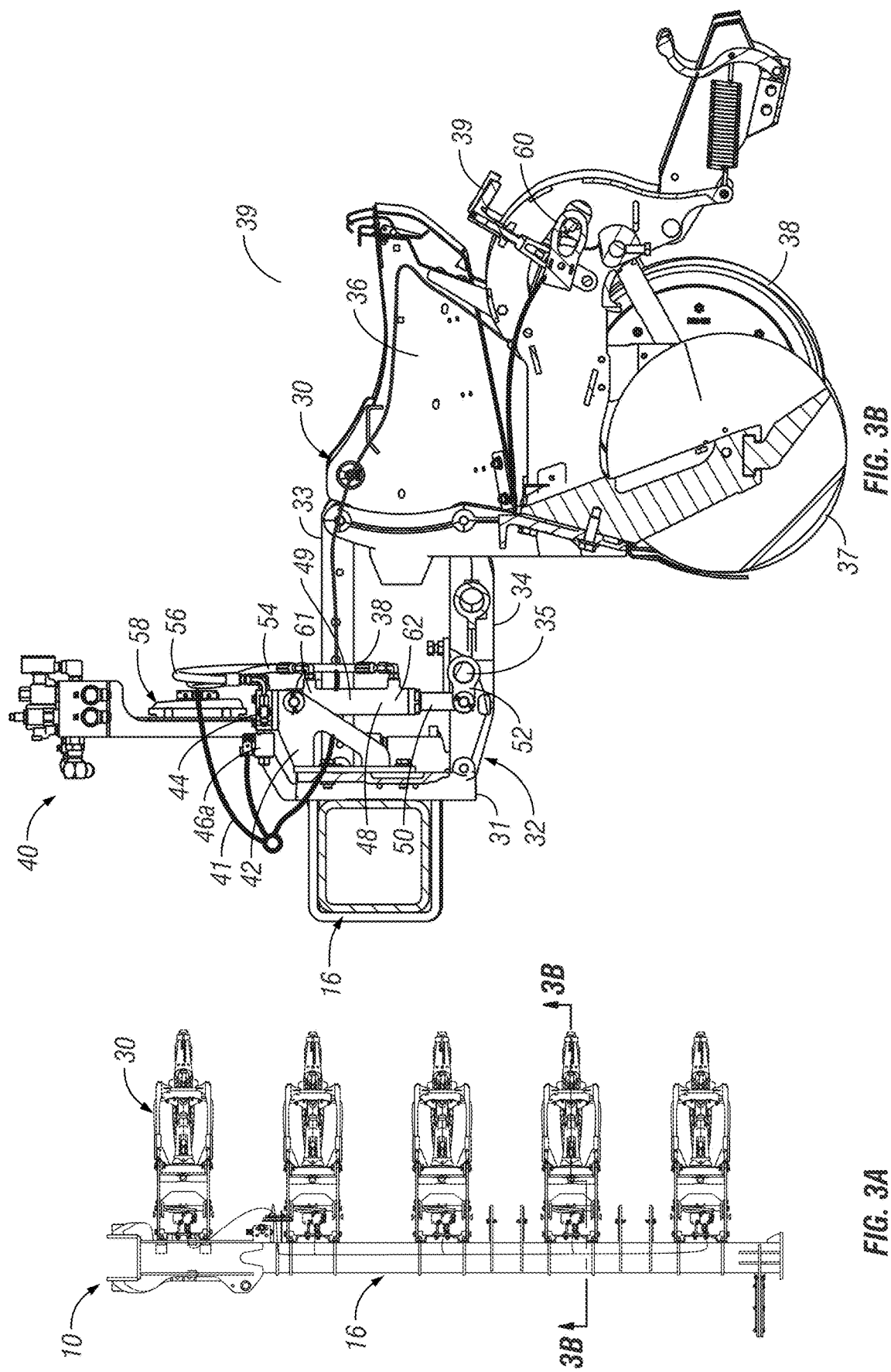
FIGS. 3A and 3B are top planar and sectional views of a row unit attached to a toolbar.

As shown in FIGS. 3A and 3B, the down force assembly 40, which can be used for both down and up force, comprises generally the components of a double acting cylinder 48, a manifold 44, a control valve 46, a mount 42, and a control unit 58. Furthermore, the control valve 46, according to some aspects, will include two control valves. For example, the assembly 40 can include a down force control valve 46a and an up-force control valve 46b. The down force control valve 46a can include a solenoid or other actuable member to allow for the adjustment of the valve. The up-force control valve 46b can be actuable, or else can be such that the up force is generally maintained at system pressure. Still further, it should be appreciated that the down force can be reduced to the point that the up force is variable. In such instances, the up-force control valve 46b will be adjustable. However, it is to be appreciated that these components are not limiting or required in all instances, and the assembly 40 may include fewer or more components as may be required by the intended use thereof. For example, as will be understood, the assembly 40 may also include electrical wires, hydraulic hoses, and/or a sensing unit for determining the amount of down force being applied by the or at the row unit 30. Still further, one or more of the components may be omitted from the assembly.

FIG. 3B is a sectional view of a row unit 30 mounted to the toolbar 16, as shown by the lines B-B in FIG. 3A. As is shown in FIG. 3B, the double acting cylinder 48 is operatively attached to the tool bar 16 via a mounting unit 42. Attached to a portion of the mounting unit 42 are the manifold 44 and the control valve 46. The control valve may include wires 41 that are connected to a control unit 58. The control unit 58 may be an intelligent control such as a processing unit, computing unit, CPU, server, or generally any other processing unit capable of receiving instructions, storing instructions, interpreting instructions, and/or providing instructions and controlling an operation of the down force assembly 40. Thus, the control unit 58 can be utilized to provide commands to the control valve 46 for operating the down force assembly 40. The control unit 58 may be connected, via hardwire or wirelessly, to a user interface, separate computing unit (tablet, phone, server, computer, etc.) and can be pre-programmed or otherwise capable of receiving instructions to pass along to the downforce assembly 40.

A double acting cylinder 48 includes a housing portion 49 and a rod 50. The rod includes a piston portion (not shown) generally within the housing 49, which can separate the housing into a first chamber 61 on the piston side of the rod, and a second chamber 62 on the rod side thereof.

As is shown throughout the figures and as will be understood, an aspect of the invention includes that the control valve 46 and manifold 44 are generally divorced from the double acting cylinder 48 such that they are not supported thereby. In other words, the control valve 46 and manifold 44 are not directly coupled to the cylinder 48, and are otherwise separable by some distance therebetween. The manifold 44, which, based upon action of the control valve, can control the flow of a fluid, such as hydraulic fluid, can be coupled to the first and second chambers on opposite sides of the piston in the cylinder housing. As stated, the control valve 46 can include multiple control valves, such as a valve for down force 46a and one for up force 46b.

For example, it is to be appreciated that the housing 49 of the cylinder 48 includes a first chamber 61 at the upper end of the housing and a second chamber 62 generally at a lower end of the housing and on the opposite side of the piston on the rod side thereof in the housing. A downforce hose 54 is connected generally between the manifold 44 and the first chamber 61 of the cylinder 48. A second hose 56 is connected between the manifold 44 and the second chamber 62 of the cylinder 48. Addition of the hydraulic fluid from the manifold via the first hose 54 to the first chamber 61 will extend the rod 50 of the cylinder 48 to provide a net down force on the row unit 30. In other words, the addition of fluid creates pressure, and it is the pressure that creates the net force. Likewise, the removal of fluid from the first chamber 61 and added to the second chamber 62, such as by the hose 54 and 56 via the manifold 44, will provide a retraction of the rod 50 relative to the housing 49, which will constitute an up force on the row unit 30. This up force will provide for a reduced amount of force or weight of the row unit relative to the ground.

As the down force control valve 46a is electrically coupled to the control unit 58 via wires 41, the control unit 58 will communicate to the control valve 46a, which may be a solenoid, on the actuation or operation of the fluid via the manifold 44, which will then provide the hydraulic fluid to the first or second chamber 61, 62 of the cylinder 48, and to provide such net up or down force thereto. Furthermore, it should be appreciated that the down force control valve 46a is generally electrically controlled, but the up-force control valve 46b is set to provide a substantially constant up force. The control unit 58 can be operated in a number of ways. For example, as shown in FIG. 3B, a sensor 60 is positioned at the row unit 30 and is configured to determine the amount of down force being applied via the row unit 30. The sensor 60 can be a number of types of sensors, and can include strain gauges, pressure transducers, or generally any other sensing configuration to calculate and/or determine amount of force being felt by the row unit. In some configurations, the sensor can be coupled to the control unit 58 such that a change of down force sensed by the sensor 60 will activate the control unit 58 to provide a change in the down and/or up force of the down force assembly 40. It is also contemplated that the sensor 60 can be in communication with a user display or graphic user interface of an operator. This graphic user interface can display the amount of down force being provided and being calculated by the sensor 60 such that an operator can manually communicate to the control unit 58 to adjust the amount of down force and/or up force applied by the down force assembly 40 to the row unit 30. Therefore, it is contemplated that the control of the down force assembly 40 can be manual and/or automatic.

The double acting cylinder 48 can be mounted to the mounting unit 42 of the down force assembly at a first end and can be connected to the row unit 30, such as via the linkage 32 at the opposite or rod end 50 at a connection 52. As shown in the figures, a cross bar 35 extends between the lower arms 34 of the linkage 32. This cross bar 35 can be positioned generally anywhere along the length of the lower arms 34. The rod 50 is connected to the cross bar 35 such that the rod 50 can be rotatably connected thereto to allow for the connection to rotate about the cross bar 35. Therefore, when a down force is activated by the down force assembly 40, the hydraulic fluid will be added to the first chamber 61 of the cylinder 48 via the hose 54 through the manifold 44, which will extend the rod 50 from the housing 49. This extension will provide a force in a generally downward direction towards the cross bar 35, which will impart more downward pressure to the row unit 30. When the down force is to subside, or an up force is to be applied via the down force assembly 40, the hydraulic fluid can be provided via the hose 56 to the second chamber 62 of the cylinder 48, which will impart a force on an underside of a piston therein, which will retract the rod 50 relative to the housing 49. This will cause a lifting force generally at the cross bar 35, which will provide an up force and reduce the amount of force on the row unit 30 relative to the ground. Therefore, the downforce assembly 40 as shown and described herein will provide for both down and/or up force via the connection to the cross bar 35. However, it is to be appreciated that use of the cross bar, such as that shown in the figures is not the only manner of connecting the cylinder 48 to the linkage or any portion of the row unit to provide the down or up force.

Figure 4:
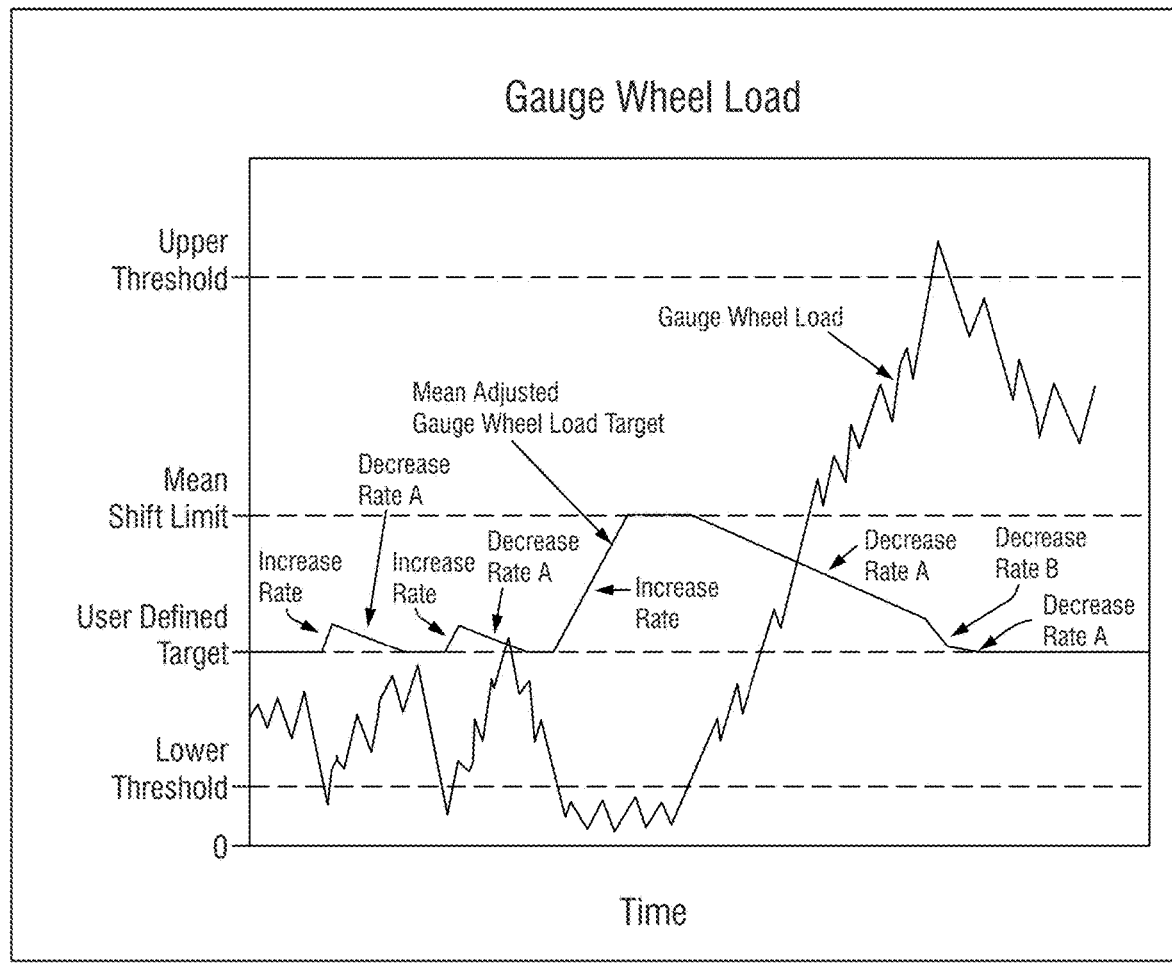
FIG. 4 is an example of a gauge wheel load value sensed over time, showing upper and lower thresholds and a user defined target to control the additional/supplemental up or down force applied to a row unit based upon the sensed gauge wheel load relative to the thresholds.

FIG. 4 is a depiction of an exemplary graph showing forces sensed by a sensor, such as the link sensor 60 shown in FIG. 3B. The sensor 60 can be considered a downforce sensor to determine an amount of down force being applied to or otherwise exerted on the row unit 30, such as between the gauge wheels and the ground. For example, the sensor 60 may be connected to the gauge wheels to determine a net force being applied to the gauge wheels based upon, at least in part, the weight of the row unit 30, the force being applied from the ground, and any up or down force being applied by an actuator or other device. As included herein, the amount of down force sensed by the sensor can be communicated to the control box 58, the control valve 46, or another device such as a user display in the tow vehicle, a portable computing device (tablet, phone, handheld, etc.), or even a dedicated computing member at a location remote of the planter. This sensed information can be utilized to adjust or monitor the down force being applied at a particular row unit, and can be used to make such adjustments on a row by row basis, i.e., row unit independent. The sensor 60 as shown in the figures extends generally between an arm connected to the gauge wheels and a portion of the frame 36 of the row unit 30. However, it should be appreciated that the exact configuration of sensor need not be employed in the invention, and generally any sensor capable of sensing down force on the row unit (e.g., gauge wheels) can be utilized and considered a part of the invention.

The graph of FIG. 4 includes a force (e.g., gauge wheel load) amount along the y-axis and time along the x-axis. The y-axis also shows an upper threshold and a lower threshold, which can be set by an operator of the system. The upper threshold is set above a target gauge wheel load, which is user defined. However, it should be appreciated that the upper threshold is not used in all embodiments, and need not be included or used in order to practice the invention of the present disclosure. Furthermore, the upper and lower thresholds could also be set and fixed such that the user is unable to materially change the amounts. The target gauge wheel load is approximately the amount desired to create and maintain a furrow of determined depth and/or compaction. The lower threshold is set below the target load, and can be set to be 25% of the max target, which can be user defined or set by the system. This could also be set to approximately 67% of the lower user defined target, according to some embodiments. For example, an exemplary situation may be provided to aid in explanation, and includes that when the max load is 200 lbs., the lower threshold can be 50 lbs. It is noted that the 200 lbs. is for illustrative purposes, and this could be set higher or lower in some settings, which may be fixed by the system or customizable by the user. Still further, the 67% of the lower user defined target is not to be construed as a requirement or limiting, and is to be understood to be an exemplary amount for some settings. Variations to the amount are to be considered a part of the invention, such as and including between 25-90%. According to other exemplary embodiments, the lowest user defined setting could be 75 lbs., with the lower threshold also at 50 lbs. The upper and lower thresholds can be preset by an operator or optimized by the system to create limits in which the load sensed by the sensor 60 is attempted to be maintained in order to maintain the depth of the furrow as the planter moves through a field with changing field, implement, row unit, and/or soil conditions. A mean shift limit is also included and is set above the user defined target gauge wheel load. The lower threshold is generally fixed or constant, regardless of the user defined set point or target, and is set to be 25% of the maximum, 67% of the lowest user defined threshold, or a fixed value, such as 50 lbs. For example, if the max target is set to 200 lbs., the lower threshold will be 50 lbs. The mean shift limit, which is not required in all embodiments, can be set to 40% of the target (e.g., 80 lbs.). This could also be set at the approximate difference between the default user defined targets. For example, if the medium setting target value is 150 lbs., and the low setting target value is 75 lbs., the mean shift limit will be 75 lbs.

The gauge wheel load is shown to be a continuously variable amount over a period of time. Two parameters are important for hydraulic downforce to increase performance. A measurement of ground contact of the gauge wheels controls the seed planting (furrow) depth, and the force on the gauge wheels controls the compaction of the soil around the trench, as well as the structure of the trench. Planting depth, and therefore ground contact, is therefore important. According to aspects of the system disclosed herein, in order to ensure the row unit stays at the desired planting depth, the target force on the gauge wheels is allowed to increase from the user defined target setting. This may be referred to as the mean adjusted gauge wheel load, or mean adjusted target. This is the user defined target plus the mean shift. There are also safeguards built into the system to avoid over-compacting the soil.

When the gauge wheel load is sensed to be below the lower threshold, the mean shift is increased at a desired rate. According to some embodiments, a counter can be used to increase the load. When the gauge wheel load is sensed to be above the upper threshold, the mean shift is decreased at desired rate B. There is also a decay factor in the algorithm that will reduce the mean shift at desired rate A toward the user defined target. The mean shift is limited to substantially prevent the load from going above the mean shift limit. With this process, the target gauge wheel load is adjusted for varying soil types and terrains in order to ensure ground contact without over-compacting the soil.

Still further, the system shown and described herein is not to be limited to measuring ground contact only with the gauge wheels. If the force of the row unit contact with the ground is determined through another member than the gauge wheels, then this algorithm, system, process, etc., will still work.

Figure 5:
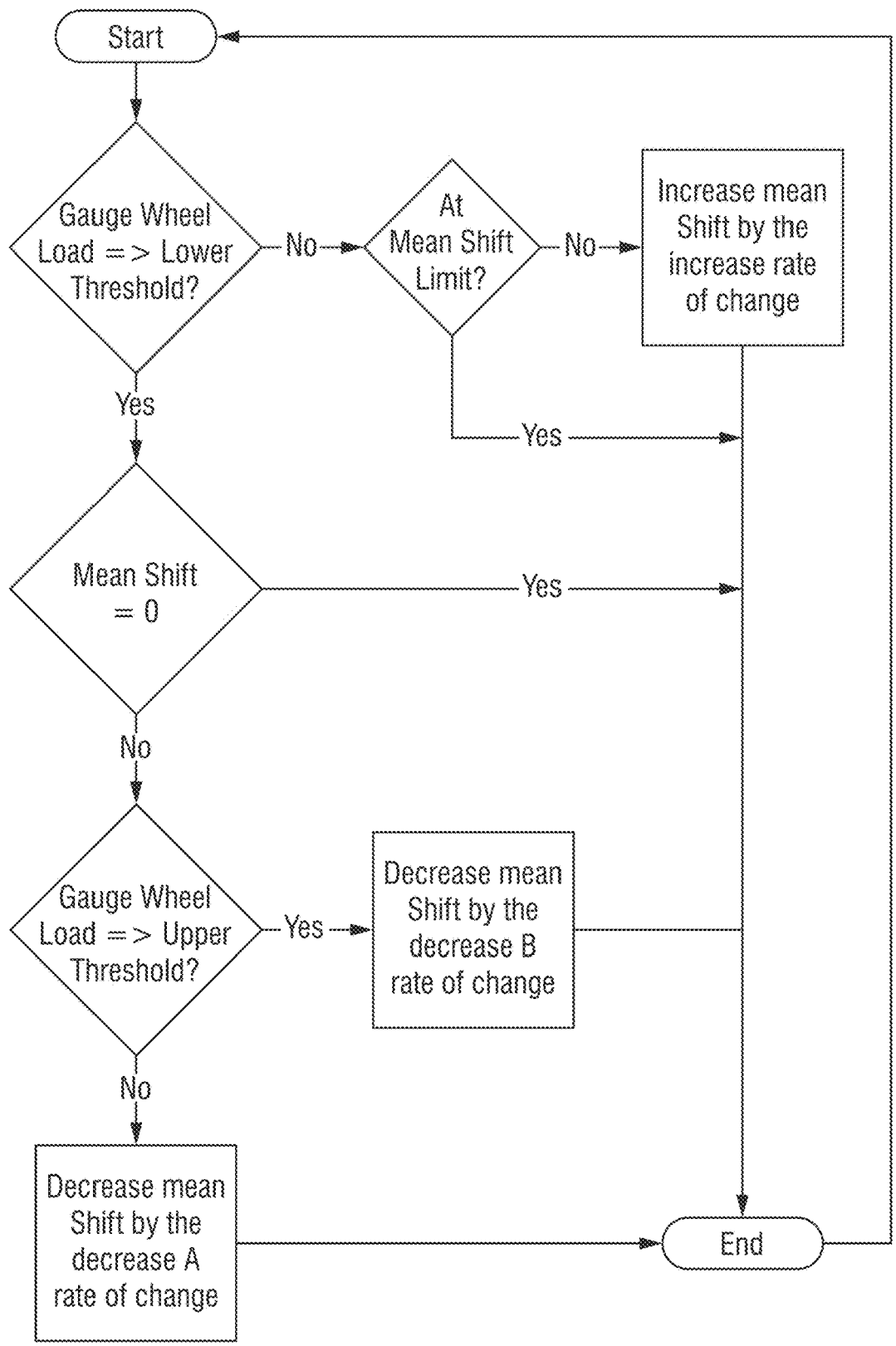
FIG. 5 is schematic of a flow chart designating the steps of a process for controlling the up and/or downforce of a row unit of an agricultural planter.

FIG. 5 is a flow chart showing the steps that the system and/or process can go through to operate the downforce system according to exemplary aspects of the invention. As shown in the flow diagram, at the start, the gauge wheel load is measured, such as by the link sensor 60, and the measured/sensed load is compared to a lower threshold. The lower threshold could be fixed, user-defined, or could be automatically configured and set by a processing unit and based upon the user defined target. If the load is not equal to or greater than the lower threshold, it is determined if the load is at the mean shift limit. If this answer is no, then the mean shift is increased by the mean shift defined rate of change. For example, the rate of change of the increase could be, according to some embodiments, about 40 lb/sec. However, this is not an absolute, and the rate of change should be configured to be enough such that the increase due to the rate of change brings the sensed load above the lower threshold within an acceptable amount of time. Accordingly, this could be about 10 lb/sec to about 100 lb/sec. If the answer is yes, the system will revert back to the start query and will cycle through the steps in a repeated and continuous manner. The system is then reset to the start point and the repeated continuously as the implement moves through the field.

When the gauge wheel load is equal to or greater than the lower threshold, the next determination is if the mean shift is substantially equal to zero. If yes, then the system reverts to the start and the process is repeated. If no, then the next determination is to see if the gauge wheel load is equal to or greater than the upper threshold. Again, the upper threshold can be fixed, user defined, or can be automatically determined and set by a processing unit. If this query is yes, then the system will decrease the mean shift by the decrease rate B defined rate of change. According to some embodiments, the decrease rate B rate of change can be a decrease of about 20 lb/sec. However, this could be more or less depending on need, such as about 1-50 lb/sec.

If the query regarding the upper threshold is determined to not be substantially equal to or greater than the upper threshold, then the system decreases the mean shift by the decrease rate A defined rate of change. According to some embodiments, the decrease rate of change A is about 5 lb/sec, but this could be about 0.5-50 lb/sec. After either decrease A or B, the system will revert back to the start query and will cycle through the steps in a repeated and continuous manner as the implement moves through the field.

The flow diagram illustrates steps that can be done for all of the row units together, or in an individual manner such that downforce at each row unit is individually and independently controlled to provide control based on location, and not implement-wide.

Examples of such intelligent control units and/or processing units considered as part of the downforce control system may be tablets, telephones, handheld devices, laptops, user displays, servers, or generally any other computing device capable of allowing input, providing options, and showing output of electronic functions. Still further examples include a microprocessor, a microcontroller, or another suitable programmable device) and a memory. The system also can include other components and can be implemented partially or entirely on a semiconductor (e.g., a field-programmable gate array ("FPGA")) chip, such as a chip developed through a register transfer level ("RTL") design process. The memory includes, in some embodiments, a program storage area and a data storage area. The program storage area and the data storage area can include combinations of different types of memory, such as read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable magnetic, optical, physical, or electronic memory devices.

Figure 6:
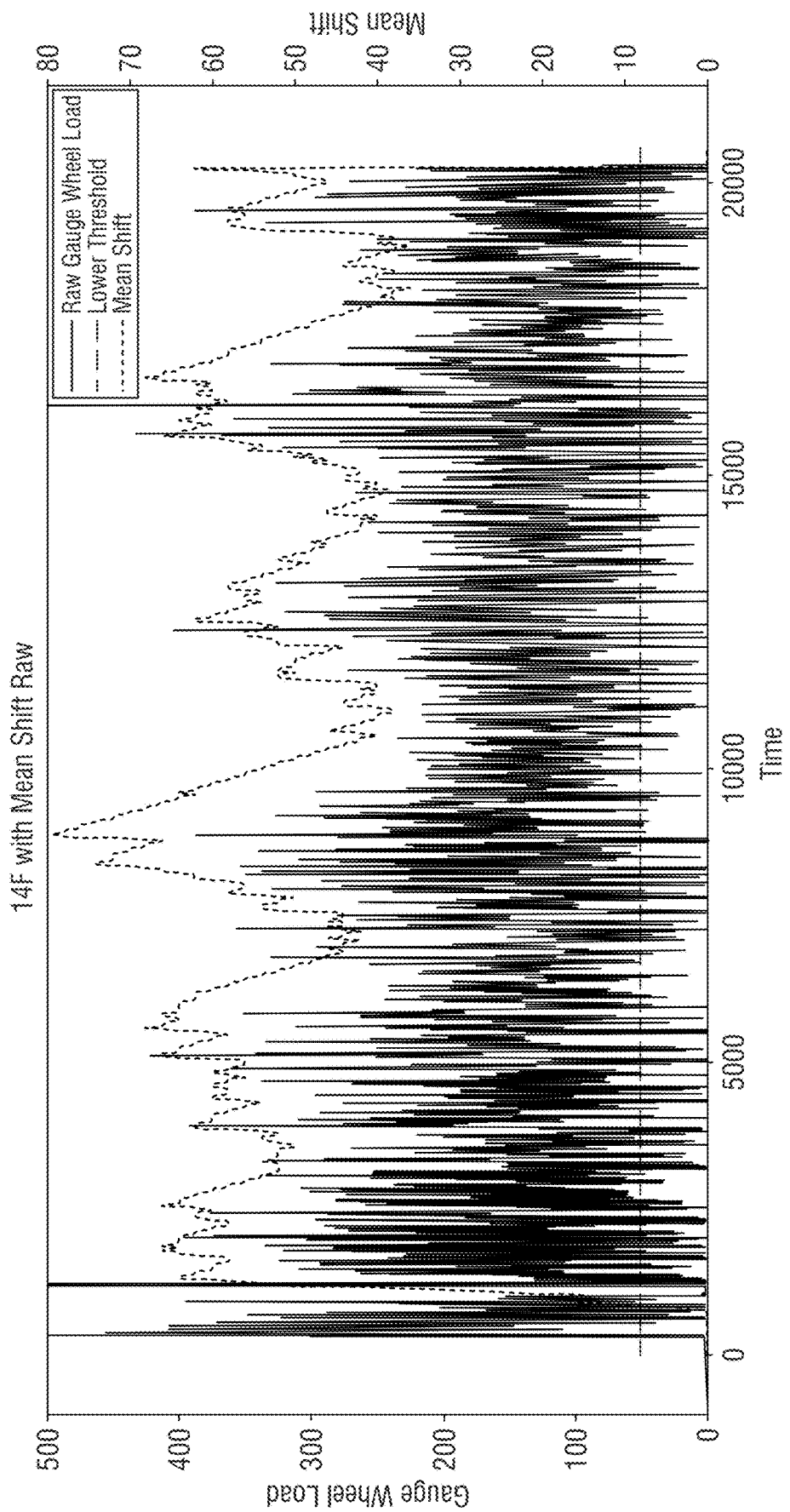
FIG. 6 is a graph showing exemplary data points of link load with a mean shift.
Figure 7:
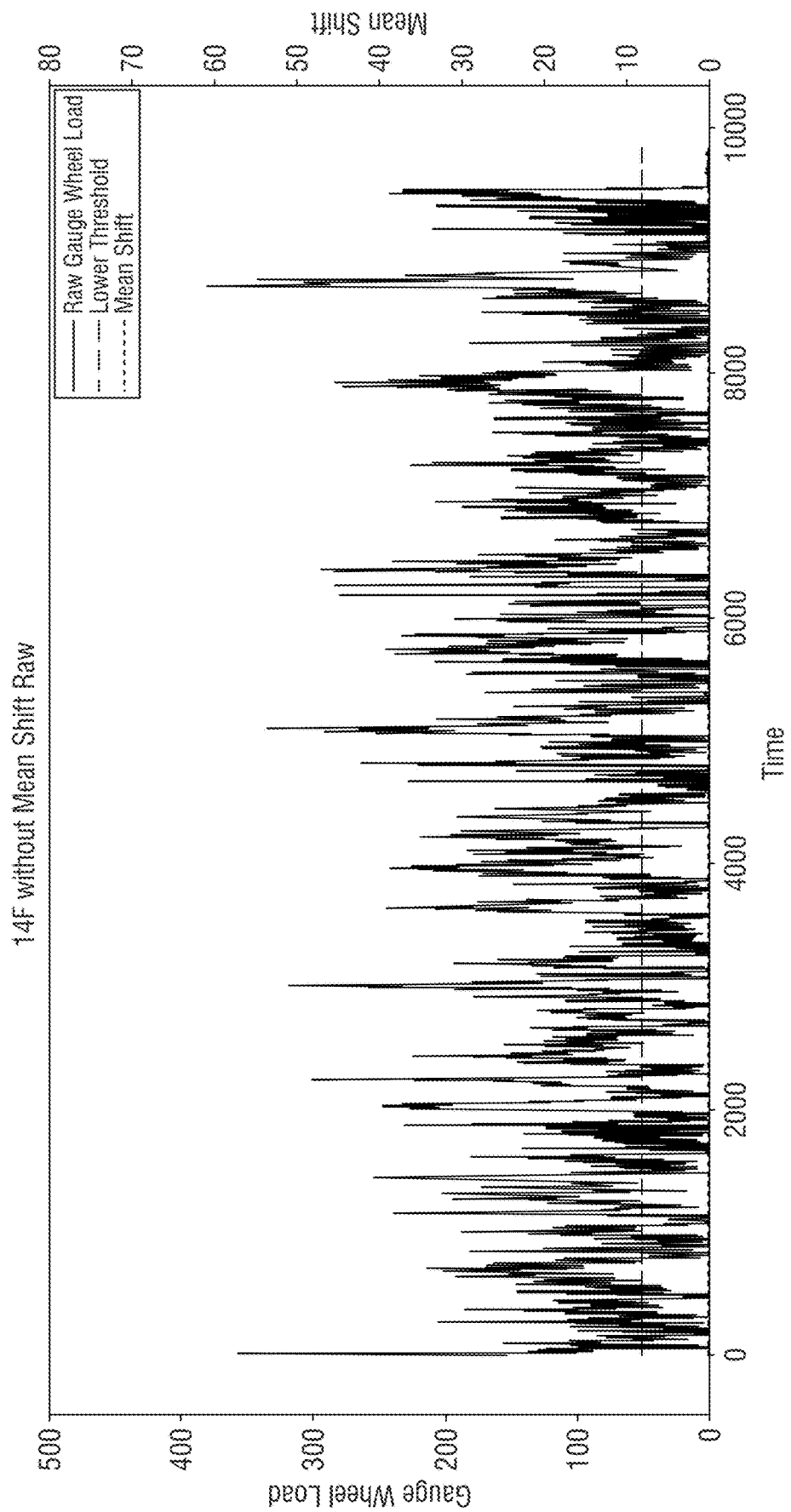
FIG. 7 is a depiction of the graph of FIG. 6 without mean shift.
Figure 8:
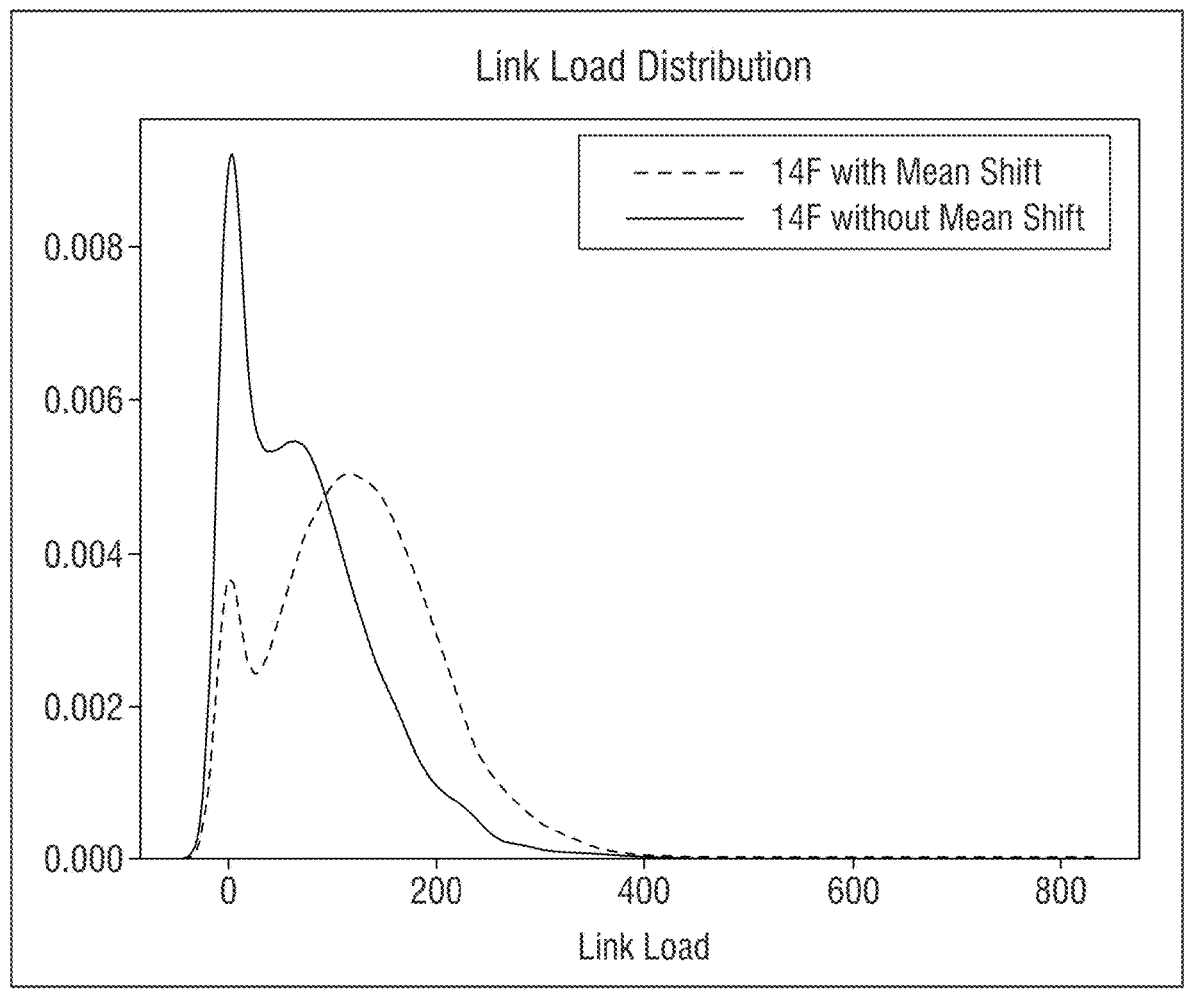
FIG. 8 is an exemplary histogram showing the number of times of loss of ground contact with and without mean shift based upon link load.

FIGS. 6-8 are exemplary data sets shown in graph form. The data represents that generated in very hard ground with the downforce system in the lowest setting (target set point is 75 pounds). The idea is that if you have a variable field with softs spots and you transition to harder soil that the system will adapt and provide adequate ground contact but also adapt back to the soft soil as necessary. It also prevents the operator from planting in too low of a setting that will result in shallow seed.

FIG. 8 is a link load distribution, which is a histogram showing how many 0's (loss of ground contact) that would occur without use of a mean shift.

FIG. 6 is a graph showing the use of a mean shift. The easiest way to evaluate the mean shift operation on this chart is to visually gauge how much raw sensed force (gauge wheel load) is shown below the lower threshold. When there is a lot, the mean shift is trending up, when there is little, it is trending down. The mean shift value shown on the chart is the amount of force that is added to the target set point. For this example, the system is averaging adding about 50 lbs on top of the 75 pound target.

As shown in FIG. 6, the raw sensed force is the forced sensed by the system. When the sensed force is below the lower threshold, the system will increase the load via the actuator by a mean shift value, which will bring the load to above the lower threshold level (mean shift threshold in FIG. 6). The mean shift value can be a fixed amount to be added to the system when the sensed value is below the threshold.

FIG. 7 is another graph without using the mean shift. The chart without mean shift shows that the overall gauge wheel load is much lower without mean shift and there are a lot more points near zero. This is in line with the histogram shown in FIG. 8.

Therefore, control systems, methods, and apparatus for controlling and operating a downforce system for an agricultural implement have been shown and described. While exemplary aspects have been shown and described, numerous changes and variations are to be considered part of the disclosure. For example, while the figures show various configurations and/or aspects of the up or down force assembly, and control systems and methods for operation thereof, it is to be appreciated that any feature of each of the figures can be utilized with any of the other figures and still be operable to provide the up and or down force to the row unit via the assembly disclosed herein. Thus, the figures themselves are not to be limiting to the exact disclosures thereof.

What is claimed is:

1. A method of controlling a downforce assembly for use with a row unit of an agricultural implement, the method comprising:
   setting a user defined target of an amount of downforce load for a row unit;
   sensing a load of the row unit;
   comparing the sensed load with a lower threshold;
   when the sensed load is below the lower threshold, adding a mean shift value to the user defined target by a rate of change to move the sensed load to above the lower threshold; and
   decreasing the mean shift value towards zero at a rate of change when the sensed load is above the lower threshold.

2. The method of claim 1, wherein the sensed load is a sensed gauge wheel load.

3. The method of claim 1, wherein the mean shift value is decreased automatically by a rate of change upon a detection that the sensed load is above the lower threshold.

4. The method of claim 1, wherein the mean shift value is decreased manually by a user.

5. The method of claim 4, further comprising identifying an upper threshold, and comparing the sensed load with both the upper and the lower thresholds.

6. The method of claim 5, further comprising, when the sensed load is above the upper threshold, reducing the mean shift value towards zero at a rate of change to move the load to below the upper threshold.

7. The method of claim 6, wherein the reduction of the mean shift value is done automatically.

8. The method of claim 6, wherein the reduction of the mean shift value is done manually.

9. The method of claim 6, wherein the decrease of the mean shift value comprises:
   a. a first change of rate for decreasing the mean shift value when the sensed load is below the upper threshold; and
   b. a second change of rate for decreasing the mean shift value when the sensed load is above the upper threshold.

10. A system for controlling an amount of downforce applied to a row unit of an agricultural implement, the system comprising:
    a downforce actuator coupled to a row unit to apply an amount of down force to the row unit;
    a sensor associated with the row unit to sense an amount of force being applied to the row unit and at least partially based upon the ground acting on the row unit; and
    a controller in communication with the downforce actuator and the sensor, said controller receiving said sensed amount of load being applied to the row unit, and wherein said controller configured to:
       compare the sensed load with a user defined target and a lower threshold;
       when the sensed load is below the lower threshold, adding a mean shift value to the user defined target by a rate of change to move the sensed load to above the lower threshold; and
       decrease the mean shift value towards zero at a rate of change when the sensed load is above the lower threshold.

11. The system of claim 10, further comprising a gauge wheel coupled to the row unit, and wherein the sensed force is the force sensed by the gauge wheel.

12. The system of claim 10, wherein the controller automatically decreases the mean shift value towards zero upon a determination that the sensed load is above the lower threshold.

13. The system of claim 10, wherein the lower threshold is calculated to be approximately 67% of the lowest user defined target.

14. The system of claim 10, wherein the lower threshold is fixed and is independent of the user defined target.

15. A method of controlling the amount of downforce applied to a row unit of an agricultural implement, the method comprising:
    sensing a load of the row unit;
    communicating the sensed load to a controller, wherein the controller:
       compares the sensed load with a user defined target and a lower threshold; and
       when the sensed load is below the lower threshold, adding a mean shift value to the user defined target by a rate of change to move the sensed load to above the lower thresholds;
    capping the added mean shift value at a mean shift limit.

16. The method of claim 15, further comprising decreasing the mean shift value toward zero at a first rate of change when the sensed load is above the lower threshold.

17. The method of claim 15, wherein the mean shift limit is approximately equal to the difference between the user defined target and a second user defined target.

18. The method of claim 15, further comprising decreasing the mean shift value toward zero at a second rate of change when the sensed load is above an upper threshold.

* * * * *